(12) United States Patent
Shamarao

(10) Patent No.: US 11,356,743 B2
(45) Date of Patent: Jun. 7, 2022

(54) MEDIA SERVICES VALIDATION TOOL

(71) Applicant: Charter Communications Operating, LLC, St. Louis, MO (US)

(72) Inventor: Shashikala Shamarao, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 389 days.

(21) Appl. No.: 16/401,019

(22) Filed: May 1, 2019

(65) Prior Publication Data
US 2020/0351569 A1 Nov. 5, 2020

(51) Int. Cl.
   G06F 9/44 (2018.01)
   H04N 21/647 (2011.01)
   G06F 11/36 (2006.01)

(52) U.S. Cl.
   CPC ... H04N 21/64723 (2013.01); G06F 11/3692 (2013.01)

(58) Field of Classification Search
   CPC ........... H04N 21/64723; H04N 21/472; H04N 21/4437; H04N 1/00031; G06F 11/3692; G06F 11/3668

See application file for complete search history.

(56) References Cited

U.S. PATENT DOCUMENTS

| 7,111,318 | B2 * | 9/2006 | Vitale | H04L 43/50 348/180 |
| 2002/0032908 | A1 * | 3/2002 | Booth | H04N 7/17309 725/86 |
| 2002/0176543 | A1 * | 11/2002 | Creamer | H04M 3/28 379/10.02 |
| 2008/0134165 | A1 * | 6/2008 | Anderson | H04N 21/4586 717/173 |
| 2017/0063478 | A1 * | 3/2017 | Flask | H04B 17/0085 |
| 2019/0213104 | A1 * | 7/2019 | Qadri | G06F 21/12 |
| 2020/0145301 | A1 * | 5/2020 | Grinkemeyer | H04L 43/045 |

\* cited by examiner

*Primary Examiner* — Chat C Do
*Assistant Examiner* — Lenin Paulino
(74) *Attorney, Agent, or Firm* — Armis IP Law, LLC

(57) ABSTRACT

A testing system and application performs validation testing on a media services delivery system by generating test transactions and validating test results at a plurality of support systems updated by the test transactions in a test environment. Support systems are independent systems that may be geographically and network distant, thus are cumbersome to access for validating corresponding updates based on a test transaction. The test system is accessible via an Internet or network portal for accessing an application that generates a test transaction, invokes a system under test for implementing the test transaction, and validates the results of the support system updates with known values for successful test completion. The test system automates the identification, retrieval and comparison of test generated values with known values corresponding to a successful transaction, and is operable to perform a suite of tests in succession from a set of predetermined test transactions and corresponding known values.

19 Claims, 9 Drawing Sheets

MEDIA SERVICES VALIDATION TOOL

BACKGROUND

Test and validation operations in large, deployed network systems is challenged by a need to continue system operation during integration, testing and validation of upgrades and revisions. Testing often needs to encompass verification of values and results at multiple network locations and/or databases to ensure propagation of data as expected. Validation requires interrogating values at different sites or subsystems. Conventional system level testing often requires coordination and retrieval of test data, operations and evaluation of results at different subsystems or locations, thus requiring intervention by multiple test engineers across the distributed sites or subsystems.

SUMMARY

A testing system and application performs validation testing on a media services delivery system by generating test transactions and validating test results at a plurality of support systems (emulation or simulated environment) updated by the test transactions. Support systems are independent systems that may be geographically and network distant, thus are cumbersome to access for validating corresponding updates based on a test transaction. The test system is accessible via an Internet or network portal for accessing an application that generates a test transaction, invokes a system under test for implementing the test transaction, including network exchanges and updates that occur one or more of the support systems, and validates the results of the support system updates with known values for successful test completion. Identification and retrieval of the test result values is cumbersome in conventional approaches because of the distant location and control of the support systems. In this manner, the test system automates the identification, retrieval and comparison of test generated values with known values corresponding to a successful transaction, and is operable to perform (in a test environment) a suite of tests in succession from a set of predetermined test transactions and corresponding known values. Subsequent to validation in a test environment, the configuration settings are deployed in the field to provide a respective service ordered by a subscriber.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below are example configurations of a tester utility and system under test in context with various support systems involved with the test results. In a media services delivery system, subscribers receive Cable TV (CATV), Video on Demand (VOD), Internet, telephone and other network based services through a monthly subscription. Additional services, such as selective VOD broadcasts and Internet roaming, may incur additional fees. Subscribers typically have at least one network conversant device such as a settop box in conjunction with the subscription, and additional devices such as cable modems and cellphones may be issued and/or employed. A media services delivery system therefore encompasses management of many subscribers, billing arrangements and devices. Support systems, therefore, some of which may be outsourced vendors and contractors, are invoked for matters such as customer records, billing, and on-screen video guides. The configurations below depict example scenarios of particular test scenarios, although various alternative subscriber, provider and equipment arrangements may be contemplated.

Figure 1:
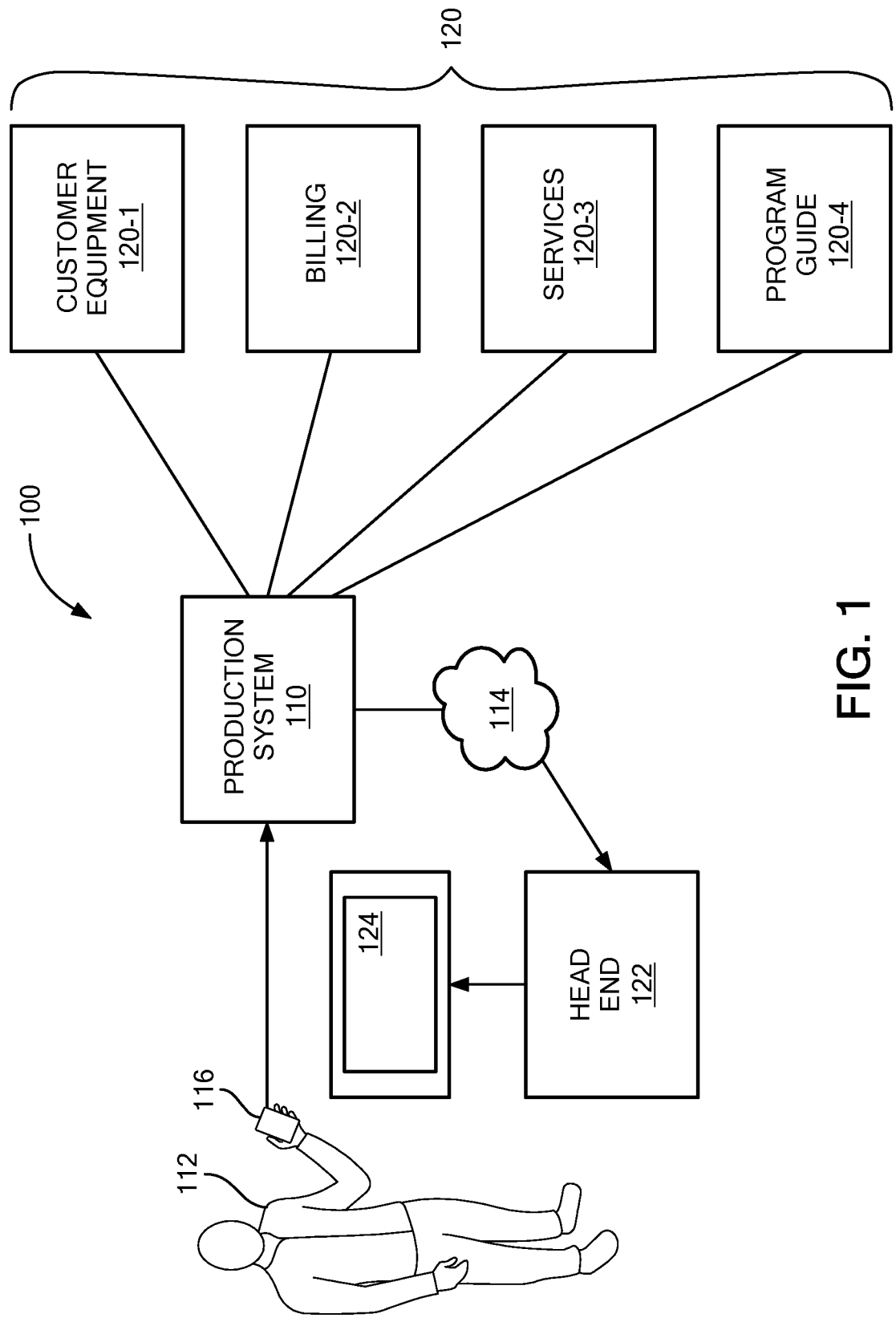
FIG. 1 is a context diagram of a media content and delivery environment suitable for use with configurations herein.

FIG. 1 is a context diagram of a media content and delivery environment 100 suitable for use with configurations herein. Referring to FIG. 1, a media service provider production system 110 coordinates and manages media services to a plurality of subscribers 112 over a network 114 such as the Internet or other suitable public or private network connection. A subscriber 112 makes a request, often with the aid of a network device 116 such as a mobile phone, set-top box/remote, laptop, smart tv or other network conversant appliance. The production system 110, in processing the request, invokes and/or updates various support systems, such as for customer equipment 120-1, billing 120-2, services 120-3 and program guides 120-4 (120 generally). Various other support systems may be employed, as multiple billing support systems may be updated to correspond to a single transaction.

Subscribed-for services are typically delivered from a head end 122 in response to direction from the production system 110 or related deployment node. The service, such as a broadcast channel or VOD content, is renderable on a device 124 appurtenant to the subscriber 112. Rendering is, of course, dependent on the service, for example Internet service may be somewhat continuous, and new subscriber registration may be a single atomic exchange. In general, however, subscriber requests generate transactions that need to be validated at the one or more support system 120 associated with the transaction.

Figure 2:
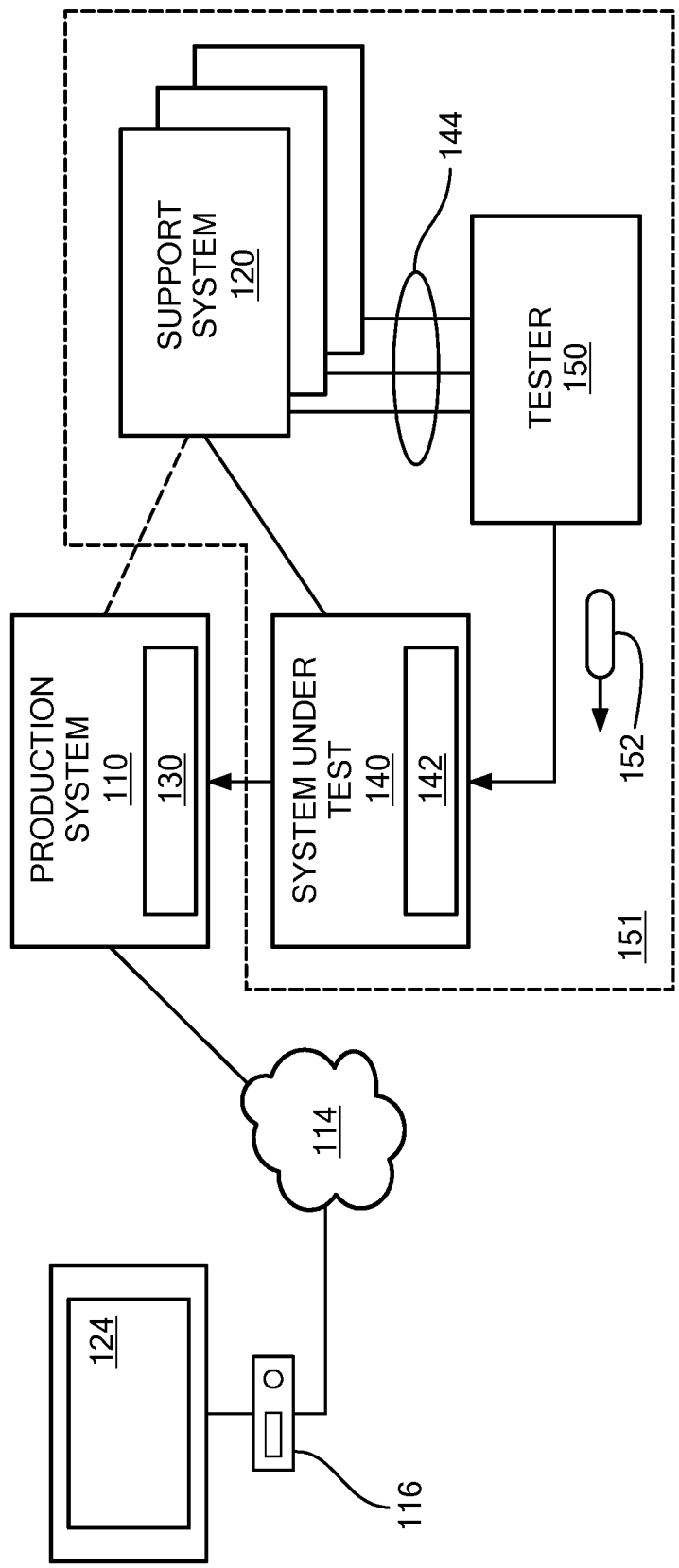
FIG. 2 is a block diagram of a media content test application operable in the environment of FIG. 1 according to embodiments herein.

FIG. 2 is a block diagram of a media content test application operable in the environment of FIG. 1. Transactions that emulate the customer requests may be validated by examining the results at the corresponding support system (test emulation/simulation environment) and ensuring accurate values are updated. An application test utility 150 (tester), such as an Application Tools and Services platform, may include a computer and application responsive to test input for generating test scenarios, directing test transactions depicting the testing scenarios to a system under test, and receiving the test results for validating the test results with a set of known values that indicate successful operation.

The production system 110 executes production system code 130 which is an application or suite of applications launchable and executable on the production system 110. A system under test 140 includes code under test 142 that generally represents an upgrade or revision to the production system code 130 that, once successfully tested and validated, will replace the production system code 130 on the production system 110. Testing is thus burdened with the need to perform in parallel with the production system 110 in performing data flow validation testing with the support systems 120 that contain the updated values for comparison.

The tester 150 represents a suite of tools that generate test transactions 152 directed to the system under test 140 for emulating real-world scenarios, or use cases, to be expected by the production system 110. The tester 150, shown as a separate entity, may be any suitable computer, test node or code operable in conjunction with the system under test 140 for generating the data structures and network exchanges with the test transaction 152 that emulates actual requests. Validation is performed by validation operations 144 for accessing values of data items stored or intended to be stored at the support systems 120. The dotted line region 151 therefore defines the testing or emulation environment that mimics the "real world" deployment environment.

Figure 3:
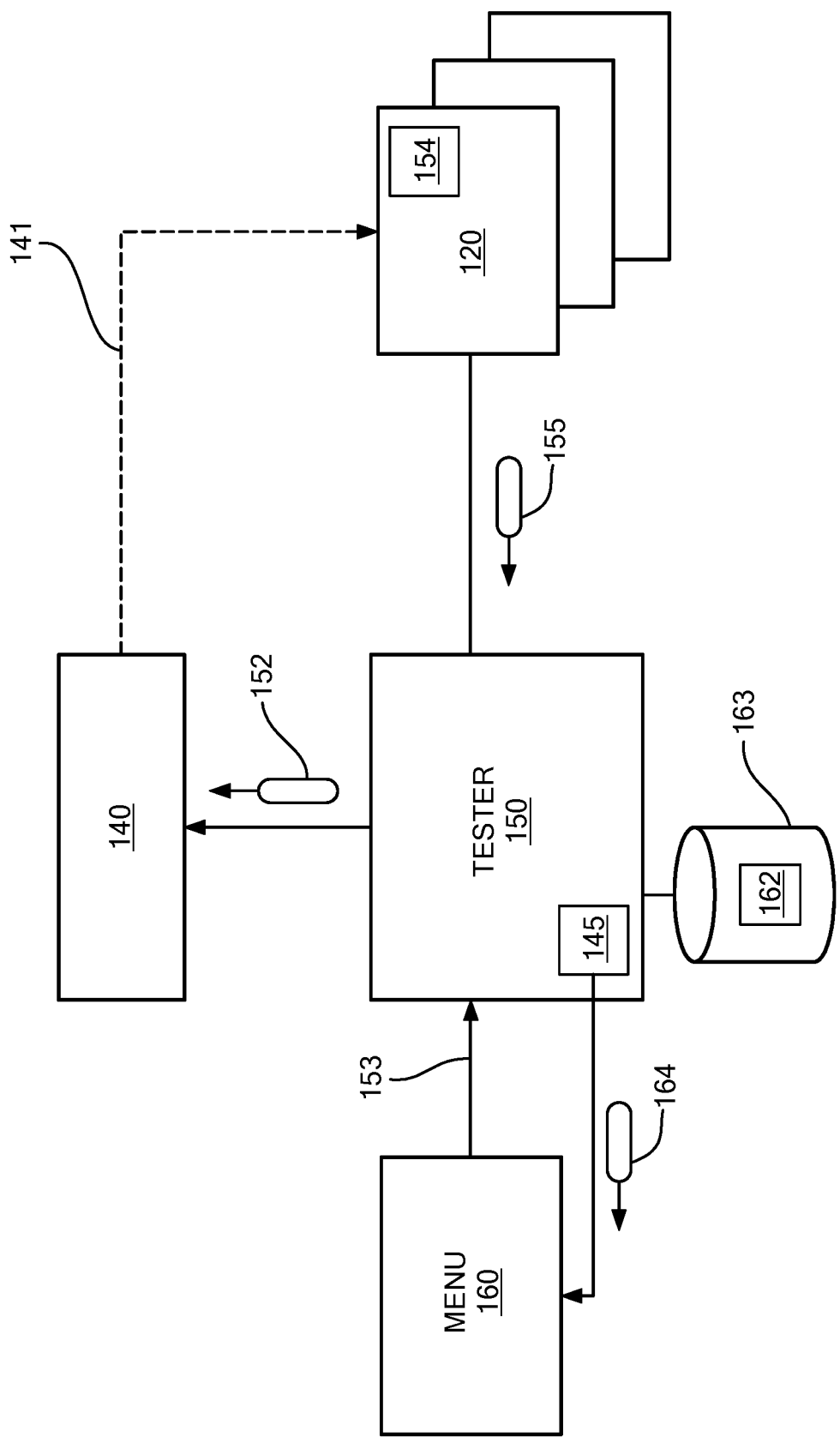
FIG. 3 is a data flow diagram of a test utility executing the test application of FIG. 2 according to embodiments herein.

FIG. 3 is a data flow diagram of a test utility executing the test application of FIG. 2. Referring to FIGS. 2 and 3, in testing the system under test 140, data validation is performed on the support systems expected to be updated by a particular test transaction. Referring to FIGS. 1-3, the production system 110 is for designating and providing media services accessible by a plurality of subscribers 112 according to a subscriber agreement. Generally, the subscriber agreement designates the media services renderable to the subscriber 112 based on a service level and a geographic region. Different subscriber packages are offered in service tiers. More inclusive tiers generally cost more. The subscriber package is also specific to a geographic region, and different channels may be available at each service tier based on the geographic area.

The method for validating deployment of media services includes receiving a designation of a subscriber 112 and a media service to be rendered, and generating the test transaction 152 operable to provide the designated media service to the subscriber for validation in the subscriber system under test 140. The test transaction 152 is generated responsive to a menu 160 of test cases and a test case selection 153 received by the tester 150. The test transaction 152 includes data items corresponding to a successful rendering of the media service to the subscriber.

Based on the test transaction 152, the tester 150 identifies data items 154 stored in a plurality of support systems corresponding to updates made based on the test transaction 152. The tester 150 compares the values of the identified data items 154 to know values 162 consistent with rendering the media service to the subscriber. The known values 162 are stored in a database or repository 163 in associating with the test cases they represent. A generated value 155 returned from the support system 120 includes or reflects the data item 154 resulting from the test transaction 152. A validation comparison operation 145, typically a simple equality, compares the values. The tester 150 delivers, based on the comparison, an indication or result 164 indicating whether the test transaction 152 includes data items for successfully providing the designated media service to the subscriber. The menu 160 for administering and evaluating test results receives and renders the result 164.

Based on the indication 164, and typically in conjunction with a plurality of successful test results, the subscriber system under test 140 may be deployed on the production system 110 configured to provide the media service to the subscriber. This may involve merely transitioning the code version 142 on the system under test to the code 130 executing on the production system 110.

Figure 4A:
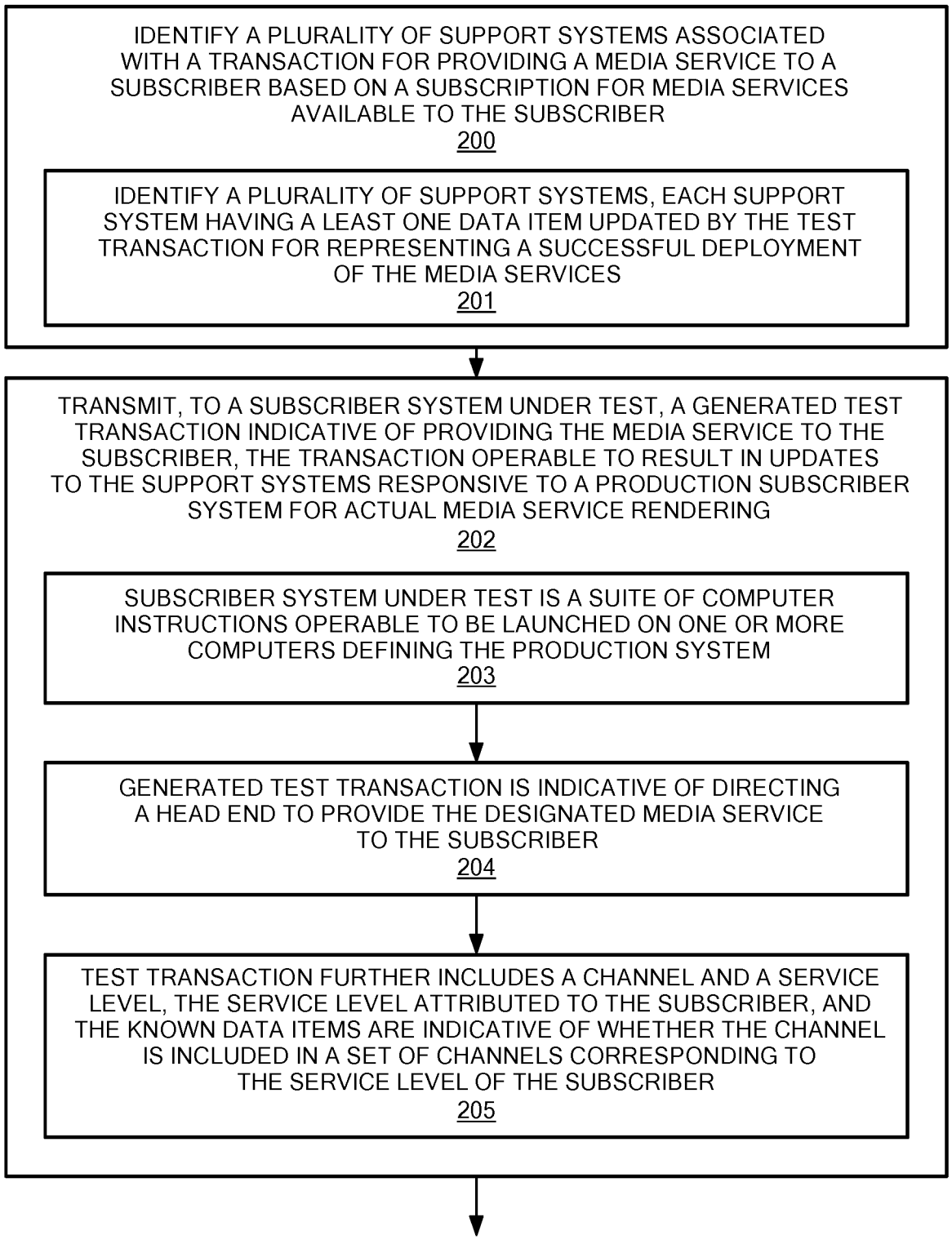
FIGS. 4A and 4B are a flowchart of the test utility operation according to FIG. 3 according to embodiments herein.
Figure 4B:
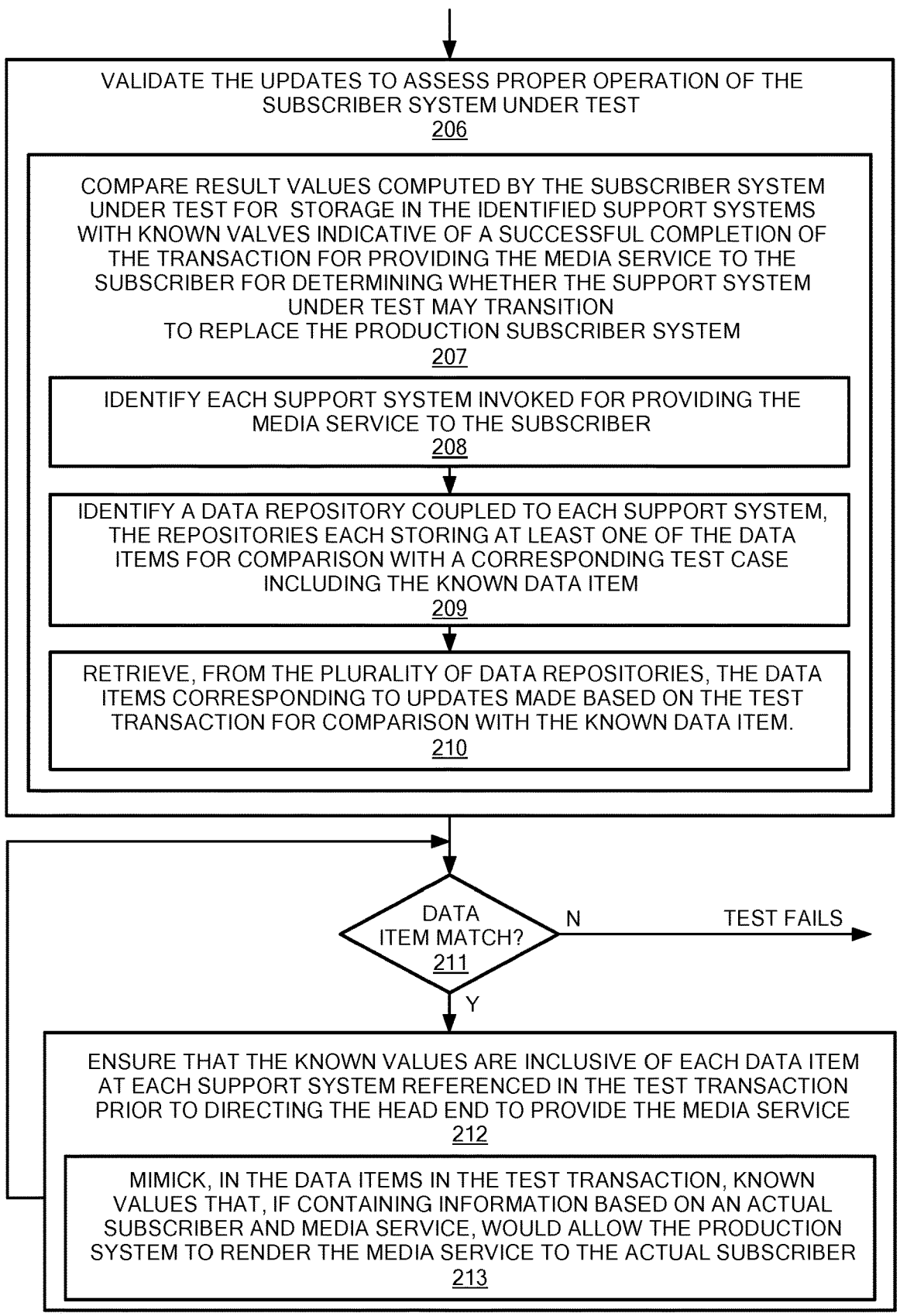

FIGS. 4A and 4B are a flowchart of the tester 150 operation according to FIG. 3 in an example test case and validation. Referring to FIGS. 3-4B, based on the selected test case 153 from the menu 160, the tester 150 identifies a plurality of support systems 120 associated with a transaction for providing a media service to a subscriber based on the subscription for media services available to the subscriber 112, as depicted at step 200. The tester 150 therefore identifies the support systems 120 that have at least one data item 154 to be updated by the test transaction 152 for representing a successful deployment of the media service, as shown at step 201.

The tester 150 transmits, to the subscriber system under test 140, the generated test transaction 152 indicative of providing the media service to the subscriber, such that the test transaction 152 is operable to result in updates 141 (FIG. 5, below) to the identified support systems 120 for providing the media service, as shown at step 202. The support systems 120 are generally responsive to the production system 110 for actual media service rendering. It is problematic to remove the support systems 120 from actual use, or to provide a duplicate for testing. Therefore, the tester 150 performs data validation on the data items that 154 that should have been written by a successful test.

The subscriber system under test 140 includes a suite of computer instructions defined as a test code version 142 operable to be launched on one or more computers defining the production system, as depicted at step 203. Launch and execution of the code version 142 defines the system under test 140, and may be any suitable computer adapted to execute the test code version. Often the test code version 142 is launchable on a smaller computer than that required for the production system 110 because it is not under the same load of transaction traffic. Upon successful validation, the test code version 142 is transitioned, in whole or in part, to be launched on the production system 110.

The generated test transaction 152 is indicative of directing the head end 122 to provide the designated media service to the subscriber 112, as depicted at step 204. This includes various ancillary transactions that underlie an actual media rendering such as a channel or VOD transmission. For example, new subscriber addition, service level changes for new channel arrangements, and billing pay-per-service incremental additions such as VOD and pay-per view (PPV) also result in testable transactions. For example, the test transaction 152 may further includes a channel and a service level, such that the service level is attributed to the subscriber, and the corresponding known data items 154 are indicative of whether the channel is included in a set of channels corresponding to the service level of the subscriber 112, as depicted at step 205.

The tester 150 validates the updates to assess proper operation of the subscriber system under test 140, as disclosed at step 206. This includes, at step 207, comparing result values 155 computed by the subscriber system under test 140, for storage in the identified support systems 120, with known values 162 indicative of a successful completion of the test transaction 152 for providing the media service to the subscriber 112. This determines whether the support system under test 140 may transition to replace the production subscriber system 110.

Validation includes, at step 208, identifying each support system 120 invoked for providing the media service to the subscriber, and identifying a data repository coupled to each support system 120. The repositories include databases and/or database tables each storing at least one of the data items 154 for comparison with a corresponding test case including known values 162, as shown at step 209. Since each test transaction 152 may result in multiple data items 154 distributed across various support systems 120, the tester 150 associates all the known values 162 with the test transaction 152 and retrieves and/or identifies the resulting data items 154 so that manual retrieval and validation at multiple support systems can be avoided. The tester 150 retrieves or gathers, from the plurality of data repositories, the data items 154 corresponding to the updates 141 made based on the test transaction 152 for comparison with the known data item or data value 162, as depicted at step 210.

Figure 5:
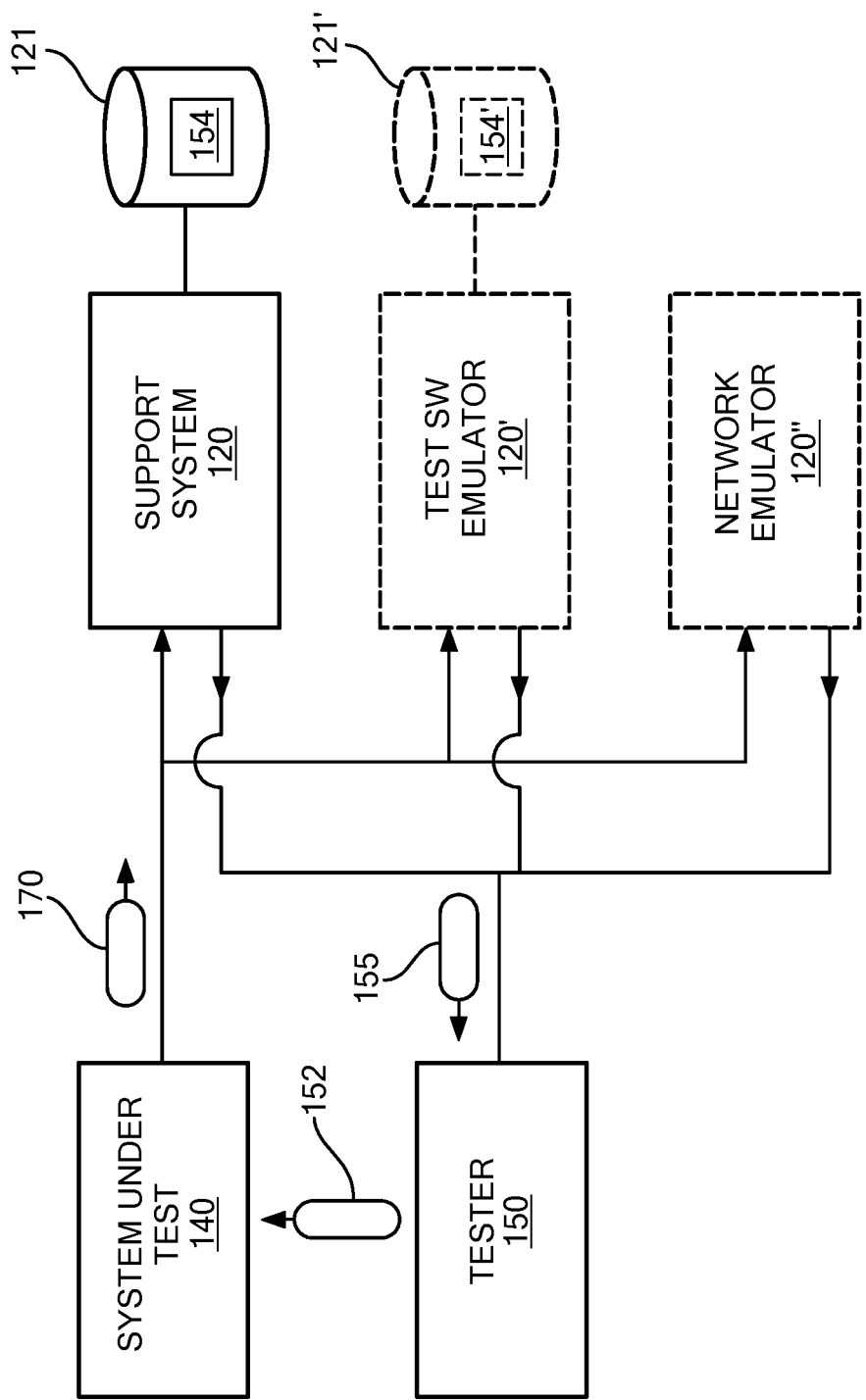
FIG. 5 shows a block diagram of test inputs, validation and results in the test utility of FIG. 4 according to embodiments herein.

A check is performed, at step 211, to identify a match or correspondence between the resulting data items 154 and the FIG. 5 shows a block diagram of test inputs, validation and results in the test utility of FIG. 4. Referring to FIGS. 2, 4 and 5, as indicated in FIG. 2 above, the support systems 120 are responsive to and/or (and/or emulate, simulate, etc.) the production system 110 via a network exchange, which may include a substantially distant, or contractor owned system which is not readily available to the staff performing testing. Therefore, it is advantageous to perform testing using known values which mimic or emulate the updates at the support system. The test transaction 152 is typically based on a service level, geographic region and channel set allocated to the subscriber 112. Once the test transaction 152 is processed by the system under test 140, results are gathered. The tester 150 issues a validation request 170. Depending on the support system 120, this may involve an actual retrieval of data items 154 stored in a repository 121 of the actual storage system 120. Alternatively, a generated value 155 may represent a mimicked value 154' in a repository 121' of an emulated support system 120.' Still further, a network exchange representing the generated values 155 may be employed by a network emulation 120" of the exchange with the support system. Whatever methodology is employed, the tester 150 receives a generated value 155 resulting from processing of the test transaction 152 for comparison with a known value 162 indicating test success.

TABLE I

| Menu Item | Sub-Menu | Description |
| --- | --- | --- |
| Ordering | New Location | Creates new location for billing order in ACSR biller |
| | New Connect | Creates new billing order in ACSR biller |
| Provisioning | Get Order Details | Retrieves customer order details from ACSR biller on specific account |
| | Update Customer | Update Customer details like Address, phone number etc. |
| | Account Overview | Provides end to end overview of the account |
| Activation | Add Device | Add real/fake devices to the account |
| STB | Retrieve Equipment | Retrieves device information from ACSR for specific order |
| | Generate Fake Device | Generate a fake device for test activities |
| | Add Device to Inventory | Add new device to biller inventory |
| History | Location Log | Contain logs of locations created by CATS user |
| | Order Log | Contain logs of orders created by CATS user |
| | Fake Device Log | Contain logs of Fake devices generated by CATS user |
| Testing | Data Validation | Retrieves data from internal Charter systems |
| | PPV Validation | Validate Pay Per View data from Micro-services |
| | Microservice Version | Check and retrieves latest micro-service versions for users |
| | Network Setting Default | Retrieves default video device settings |
| Help | Application User Guide | User guide |
| | About | Details about application version and release |
| | Contact Us | Contact details of team | known values 162 that indicate successful completion. At step 212, the tester 150 ensures that the known values are inclusive of each data item 154 at each support system 120 referenced in the test transaction 152 prior to deploying the code version under test 142 on the production system 110 for directing the head end 122 to provide the media service. This may include mimicking, in the data items in the test transaction 152, known values 162 that, if containing information based on an actual subscriber and media service, would allow the production system 110 to render the media service to the actual subscriber 112, as shown at step 213. The check at step 211 is iterated for each known value 162 expected to result from the test transaction 152 for ensuring a match with the actual or mimicked values, otherwise the test fails. An advantage of the tester 150 maintaining and comparing the known values 162 is that the support systems 120 may continue to perform operations for actual media service rendering to subscribers while the result values are computed, and need not impede operation.

Figure 6:
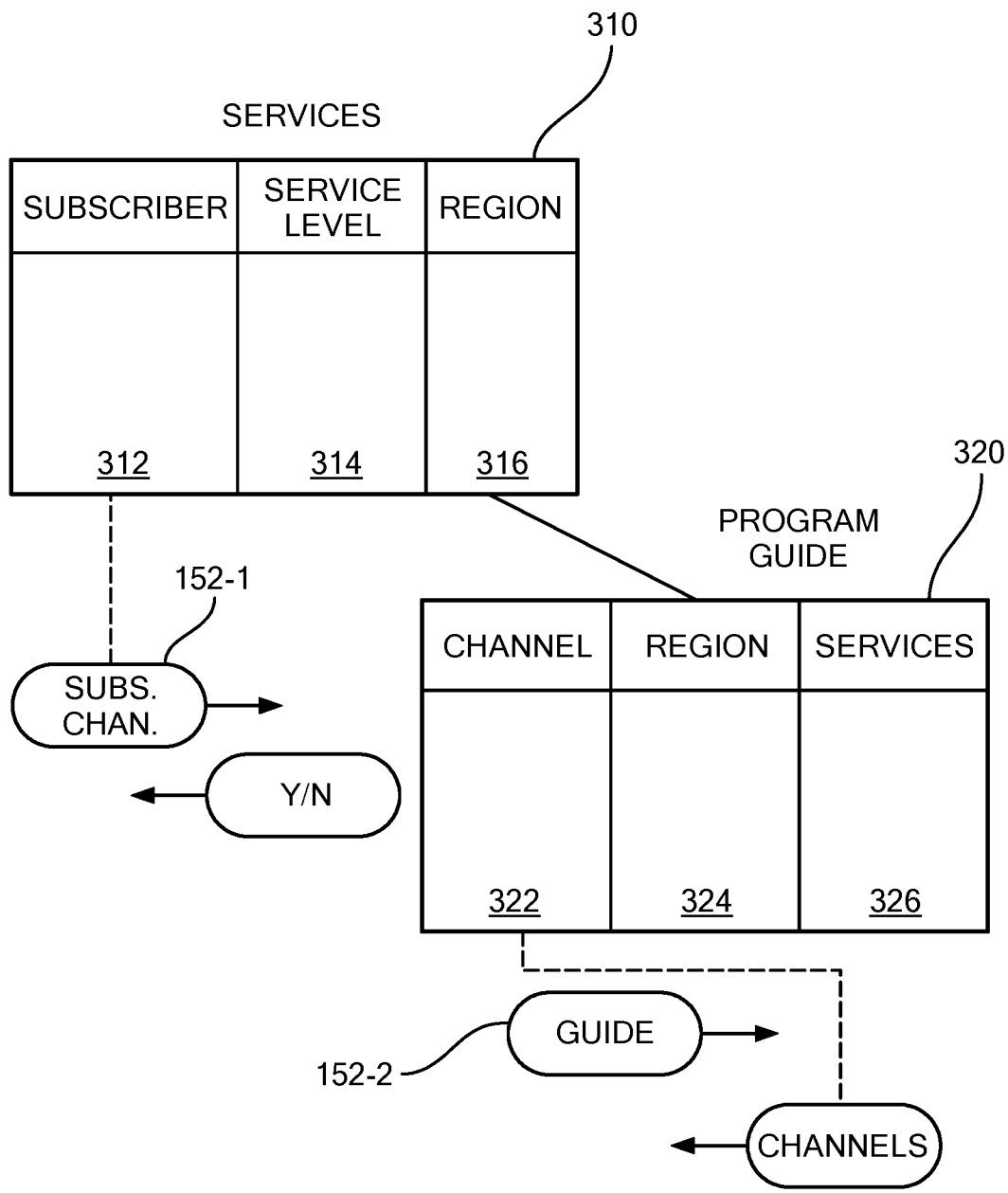
FIG. 6 shows a structure of a support system repository and corresponding test transaction according to embodiments herein.

FIG. 6 shows a structure of a support system repository and corresponding test transaction 152. As indicated above, the test transaction 152 is generated based on the menu 160 selection of options for a Controlled Application Tools and Services (CATS) application operable on the tester, and depicted in TABLE I. This includes a subscriber, service level and channel, as well as other support transactions. Particular scenarios addresses different channel packages available at different service levels available to a particular geographic area or region. Accordingly, a services entity 310 includes entries for a subscriber 312, service level 314 and geographic region 316 corresponding to a subscription. A test transaction 152-1 includes the subscriber and a requested channel. A generated value 155 is simply a confirmation or denial (Yes/No) of whether the requested channel is included in the set of channels available at the service level 314 of the subscriber in the region 316. A related entity includes a program guide 320, which indicates the set of channels 322 at each service level 326 in a geographic region 324. For example, a test transaction 152-2 for a program guide would identify, based on the subscriber 112 from which the request emanated, the service level 314 and region 316, and return generated values for each channel available for the service level in the region of the subscriber.

Particular test transactions 152 therefore include scenarios such as a channel guide request, in which at least one of the support systems 120 includes a channel mapping defining a mapping of the set of channels to a service level and a geographic area.

The examples that follow illustrate that the production system 110, in operation, exists in a context where some support systems and remote entities are third party systems invoked on a fee for services basis. There may not be access to control or augment these systems to suit test needs. The production system 110, for example, may run on a third party hosting service such as a virtual machine (VM) or similar service. Support systems 120, for example billing, may be third parties who provide a billing service, but the support system 120 and related code is neither under test nor under control for change, and need be treated as a "black box" for testing purposes. Without the approach as describe herein, testing involves accessing the data written or changed by a test at each individual third party system, gathering it from the third party system, and matching to test values back at the system under test 140 for correlation.

One example herein includes a settop box 116 network device (and/or corresponding service ordered by a customer), which typically resides (when finally deployed) at the customer point of service for receiving the media services and rendering audio and video on a rendering device. The settop box 116 is delivered to a subscriber in response to a request for a video package, as opposed to Internet or telephone services.

Upon ordering a video service, prior to shipping hardware and/or providing a corresponding requested service, a check can include validating intermediate nodes required for ensuring video service delivery from the source, usually the head end 122, to the destination such as the settop box 116 once installed. Validation therefore can include ensuring proper data is intact at each required system along the path in a test environment (environment simulating the actual hardware/software resources) in the field that will eventually be used to provide a requested service. In one embodiment, settop box data is mimicked in test environment in a laboratory using lab equipment that emulates and/or simulates an actual environment where the service is to be deployed. While the actual settop box is delivered separately to the subscriber, testing includes the instructions (software) that would allow the customer to receive the proper service once the settop box 116 is actually installed at network the actual field environment.

Figure 7:
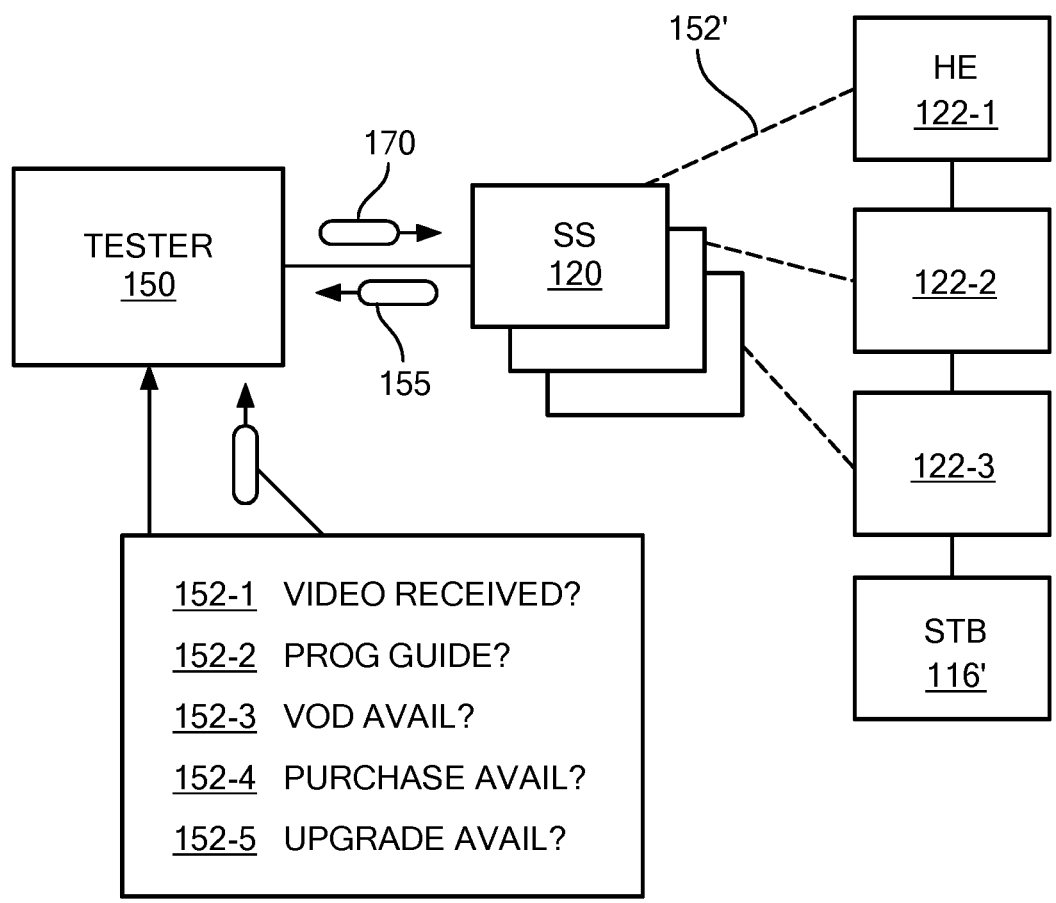
FIG. 7 shows a series of data items that may be tested in settop box deployment according to embodiments herein.

Thus, in one embodiment, internal lab testing is employed prior to production system deployment of the respective ordered service. In the case of the settop box 116, testing may include a series of tests to ensure proper response/operation of the settop box. FIG. 7 shows a series of data items that may be tested in settop box deployment. Referring to FIGS. 5 and 7, a settop box 116' is to be deployed in a target network environment such as Dallas, for receiving video services from a headend 122-1 resource or any of a plurality of nodes 122-2 . . . 122-3 between the source and destination. This deployment supports a plurality of transactions (dotted line 152') during successful operation. A suite of test transactions 152-1 . . . 152-7 is enumerated by the tester 150 to correspond to successful deployment and rendering of these transactions. Each of these test transactions 152 triggers a validation request 170 to the support systems 120 involved. Each validation request results in one or more generated values 155 for evaluation by the tester 150. In one embodiment, in the test environment, the transactions 152 include:

i. Video available? 152-1 (does the proposed set top box in the test environment receive video? If so, it can be expected that the set top box would receive video in the actual field when later deployed).

ii. Program guide available for subscribed package? 152-2 (does the proposed set top box in the test environment receive a program guide? If so, it can be expected that the set top box would receive the program guide in the actual field deployment at a later time).

iii. On demand (VOD) available? 152-3 (does the proposed set top box in the test environment receive VOD services? If so, it can be expected that the set top box would receive the VOD services in the actual field deployment).

iv. Able to purchase VOD? 152-4 v. Upgrade available? 152-5

Another example includes a test transaction 152 for a new subscriber, validation may include receiving notification of a subscriber and a new media service to be provided to the subscriber in a network environment, and validating configuration settings in a test network (such as support system 120, test emulator 120', network emulation 120") to subsequently provide the new media service to the subscriber 112 in the actual network where the subscriber operates a device. The test network therefore simulates/emulates the actual network 114 over which the service is to be provided to the subscriber in the network environment. Once validated by a successful test in an emulation/simulation environment, the production system 110 may implement the validated configuration settings in the actual network 114 to provide the media service (or hardware) to the subscriber 112.

In one embodiment, the test environment for testing configuration settings, hardware, etc., associated with a new service to be provided to a subscriber includes an exact replica of the actual network of hardware/software (such as headend 122-1, resource 122-2, resource 122-3, etc.) in the field but in a laboratory setting that mimics the functionality in the field. As described herein, testing in the laboratory setting ensures that the final product (software, hardware, etc.) supporting the newly requested service will operate properly when implemented in the actual field environment (such as headend 122-1, resource 122-2, resource 122-3, etc.).

If testing of a service in the test environment fails, embodiments herein include troubleshooting any of one or more settings associated with resources in the test environment, identifying an update to same that is needed to ensure that delivery of the service is possible, and then implementing any of those changes in the actual field environment to provide a respective subscriber with a requested service. Thus, instead of deploying a service in the field and troubleshooting multiple resources in the field to provide the service, embodiments herein include validating a service in the test environment before deployment to reduce overall time associated with its implementation.

Another test transaction 152 depicts a scenario where the media service is a video stream and the test transaction 152 includes a subscriber 112, a geographic area, a service level and a channel, and comparing the known values 162 includes identifying a service level of the subscriber, identifying a set of channels based on the service level and the geographic area, determining if the channel in the test transaction 152 is included in the identified set of channels, and determining if the head end 122 is directed to render the video stream based on whether the channel is in the identified set of channels.

A further test transaction 152 is for determining if a subscriber may receive a particular channel in the test environment, and includes identifying the support system 120 having the channel mapping, referencing, on the identified support system, the mapping to map the subscriber and service level to a channel set corresponding to a geographic area and service level of the subscriber. Based on these, the tester 150 compares a channel for providing the designated media service with the mapped channel set, and determines, based on the comparison, if the compared channel accurately reflects the channel set available for the service level of the subscriber.

A billing entry defines another test transaction, such that the support systems 120 include a billing system, and comparing the known values further includes identifying a medium of monetary exchange corresponding to the subscriber, such as invoicing, credit card, or web service, and determining a cost of the media service and associating the determined cost with the identified medium for the subscriber. Depending on the service, e.g. monthly billing or video on demand, invoicing or credit card may be a preferred payment medium.

Figure 8:
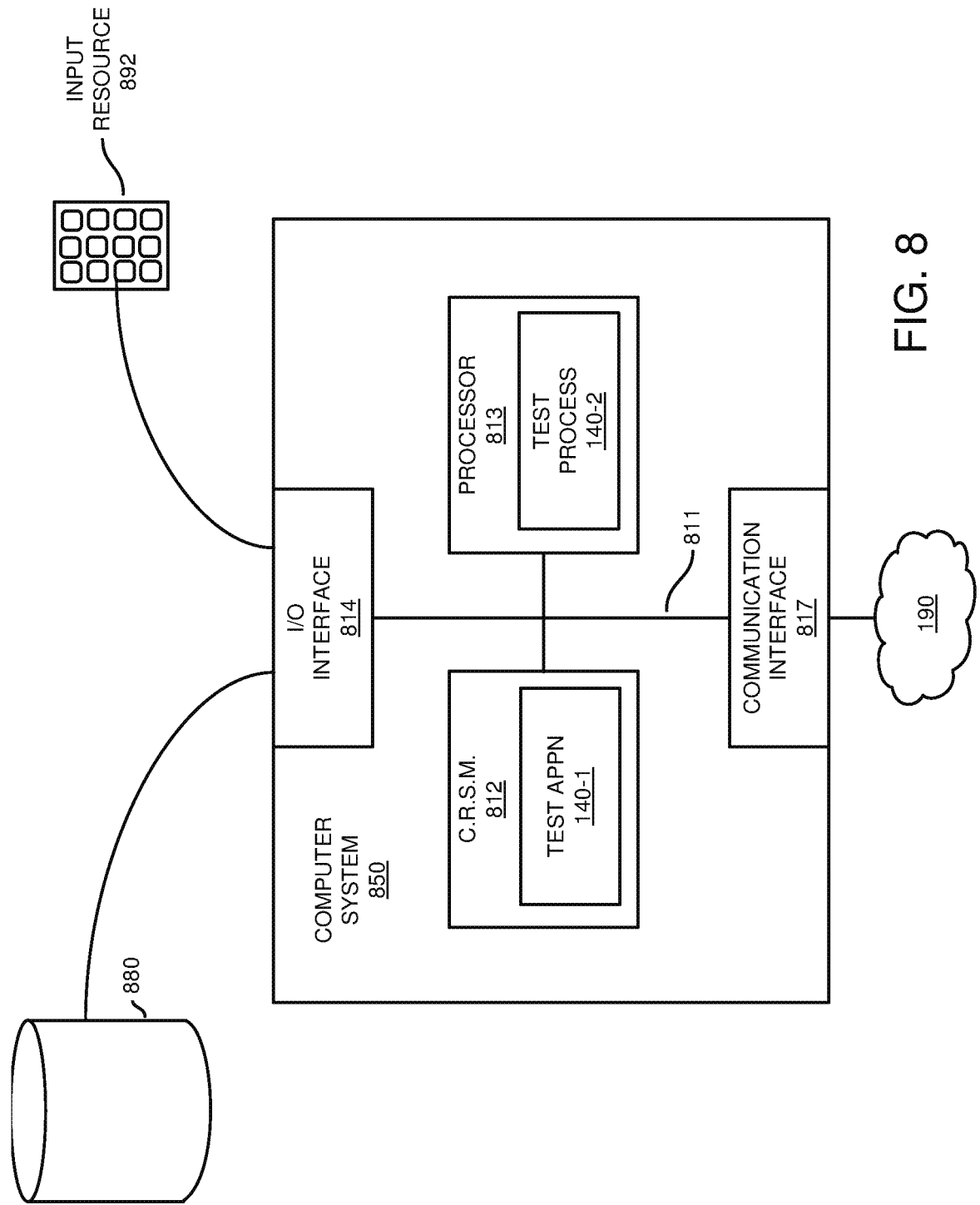
FIG. 8 is an example diagram illustrating example computer architecture operable to execute one or more operations according to embodiments herein.

FIG. 8 is an example block diagram of a computer system for implementing any of the operations as previously discussed according to embodiments herein.

Any of the resources (such as tester 150, support system 120, emulator 120', emulator 120", etc.) as discussed herein can be configured to include computer processor hardware and/or corresponding executable (software) instructions to carry out the different operations as discussed herein.

As shown, computer system 850 of the present example includes an interconnect 811 coupling computer readable storage media (C.R.S.M) 812 such as a non-transitory type of media (which can be any suitable type of hardware storage medium in which digital information can be stored and retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with tester application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in in the tester application 140-1 stored on computer readable storage medium 812. Execution of the tester application 140-1 produces tester process 140-2 to carry out any of the operations and/or processes as discussed herein.

Those skilled in the art will understand that the computer system 850 can include other processes and/or software and hardware components, such as an operating system that controls allocation and use of hardware resources to execute tester application 140-1.

In accordance with different embodiments, note that computer system may reside in any of various types of devices, including, but not limited to, a mobile computer, wireless communication device, gateway resource, communication management resource, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for testing a media service and delivery system, comprising:
identifying a plurality of support systems associated with a transaction for providing a media service to a subscriber based on a subscription for media services available to the subscriber;
transmitting, to a subscriber system under test upstream from a headend, a generated test transaction indicative of providing the media service to the subscriber downstream from the headend,
the test transaction including one or more data items corresponding to a successful rendering of the media service to the subscriber, and
each support system having at least one data item updated by the test transaction for representing a successful deployment of the media service;
the test transaction operable to result in updates to the identified support systems for providing the media service, the support systems responsive to a production subscriber system for actual media service rendering, the support systems continuing to perform operations for actual media service rendering to subscribers while a result value is computed; and validating the updates by comparing the identified data items to known values consistent with rendering the media service to the subscriber to assess proper operation of the subscriber system under test;

the media service being a video stream and the test transaction including a subscriber, a geographic area, a service level and a channel, comparing the known values further comprising:
i) identifying a service level of the subscriber,
ii) identifying a set of channels based on the service level and the geographic area,
iii) determining if the channel in the test transaction is included in the identified set of channels, and
iv) determining if the head end is directed to render the video stream based on whether the channel is in the identified set of channels;

delivering, based on the comparison, the result value indicative of whether the test transaction includes the data items for successfully providing the designated media service to the subscriber; and based on the indication, deploying the subscriber system under test on the production subscriber system upstream from the headend and configured to provide the media service to the subscriber.

2. The method of claim 1 wherein validation further includes comparing result values computed by the subscriber system under test for storage in the identified support systems with known values indicative of a successful completion of the test transaction for providing the media service to the subscriber for determining whether the support system under test may transition to replace the production subscriber system.

3. The method of claim 1 wherein the support systems are responsive to the production system via a network exchange.

4. The method of claim 1 wherein the test transaction is based on a service level, geographic region and channel set allocated to the subscriber.

5. The method of claim 1 wherein the test transaction is based on validation of a channel allocation of channels available for transmission to a subscriber based on a geographical location and service level of a subscriber.

6. The method of claim 1 further comprising:
inserting mimicked values into the test transaction, the mimicked values selected based on results expected from the support systems;
generating a known value indicative of a successful completion from the support systems based on the mimicked value; and
validating the updates based on a comparison of the known value with the result value based on the support systems and the mimicked value.

7. In a subscriber system for designating media services accessible by a plurality of subscribers according to a subscriber agreement, the subscriber agreement designating media services renderable to a subscriber based on a service level and a geographic region, a method for validating deployment of media services, comprising:
receiving a designation of a subscriber and a media service to be rendered;
generating a test transaction indicative of providing the designated media service to the subscriber for validation in a subscriber system under test upstream from a headend, the test transaction including one or more data items corresponding to a successful rendering of the media service to the subscriber downstream from the headend;
identifying a plurality of support systems invoked for providing the media service to the subscriber, each support system having at least one data item updated by the test transaction for representing a successful deployment of the media service;
identifying the data items stored in the plurality of support systems corresponding to the updates made based on the test transaction, the support systems continuing to perform operations for actual media service rendering to subscribers while a result value is computed;
comparing the identified data items to know values consistent with rendering the media service to the subscriber from the headend;
the media service being a video stream and the test transaction including a subscriber, a geographic area, a service level and a channel, comparing the known values further comprising:
i) identifying a service level of the subscriber,
ii) identifying a set of channels based on the service level and the geographic area,
iii) determining if the channel in the test transaction is included in the identified set of channels, and
iv) determining if the head end is directed to render the video stream based on whether the channel is in the identified set of channels;
ensuring that the known values are inclusive of each data item at each support system updated by the test transaction prior to directing the head end to provide the media service;
delivering, based on the comparison, the result value indicative of whether the test transaction includes the data items for successfully providing the designated media service to the subscriber; and
based on the indication, deploying the subscriber system under test on a production system upstream from the headend and configured to provide the media service to the subscriber.

8. The method of claim 7 wherein the subscriber system under test is a suite of computer instructions operable to be launched on one or more computers defining the production system.

9. The method of claim 7 wherein the generated test transaction is indicative of directing a head end to provide the designated media service to the subscriber.

10. The method of claim 9 wherein the test transaction further includes a channel and a service level, the service level attributed to the subscriber, and the known values are indicative of whether the channel is included in a set of channels corresponding to the service level of the subscriber.

11. The method of claim 7 further comprising mimicking, in the data items in the test transaction, known values that, if containing information based on an actual subscriber and media service, would allow the production system to render the media service to the actual subscriber.

12. The method of claim 7 further comprising:
identifying a data repository coupled to each support system, the repositories each storing at least one of the data items for comparison with a corresponding test case including the known data item; and
retrieving the data item from the repository for comparison with the known data item.

13. The method of claim 12 further comprising retrieving, from the plurality of data repositories, the data items corresponding to updates made based on the test transaction.

14. The method of claim 7 wherein at least one of the support systems includes a channel mapping defining a mapping of the set of channels to a service level and a geographic area.

15. The method of claim 7 wherein the support systems include a billing system, and comparing the known values further comprises:
i) identifying a medium of monetary exchange corresponding to the subscriber;
ii) determining a cost of the media service; and
iii) associating the determined cost with the identified medium for the subscriber.

16. The method of claim 14 further comprising:
i) identifying the support system having the channel mapping;
ii) referencing, on the identified support system, the mapping to map the subscriber and service level to a channel set corresponding to a geographic area and service level of the subscriber;
iii) comparing a channel for providing the designated media service with the mapped channel set; and
iv) determining, based on the comparison, if the compared channel accurately reflects the channel set available for the service level of the subscriber.

17. A non-transitory computer readable storage medium having instructions stored thereon, the instructions, when carried out by computer processor hardware, cause the computer processor hardware to:
receive a designation of a subscriber and a media service to be rendered in a subscriber system for designating media services accessible by a plurality of subscribers;
generate a test transaction indicative of providing the designated media service to the subscriber for validation in a subscriber system under test upstream from a headend, the test transaction including one or more data items corresponding to a successful rendering of the media service to the subscriber downstream from the headend;
identify a plurality of support systems invoked for providing the media service to the subscriber, each support system having at least one data item updated by the test transaction for representing a successful deployment of the media service;
identify the data items stored in the plurality of support systems corresponding to the updates made based on the test transaction, the support systems continuing to perform operations for actual media service rendering to subscribers while a result value is computed;
compare the identified data items to know values consistent with rendering the media service to the subscriber from the headend;
the media service being a video stream and the test transaction including a subscriber, a geographic area, a service level and a channel, comparing the known values further comprising:
i) identifying a service level of the subscriber,
ii) identifying a set of channels based on the service level and the geographic area,
iii) determining if the channel in the test transaction is included in the identified set of channels, and
iv) determining if the head end is directed to render the video stream based on whether the channel is in the identified set of channels;
ensure that the known values are inclusive of each data item at each support system updated by the test transaction prior to directing the head end to provide the media service;
deliver, based on the comparison, the result value indicative of whether the test transaction includes the data items for successfully providing the designated media service to the subscriber; and
based on the indication, deploy the subscriber system under test on a production system upstream from the headend and configured to provide the media service to the subscriber.

18. The computer readable storage medium of claim 17, wherein the computer processor hardware is further operable to: mimick, in the data items in the test transaction, known values that, if containing information based on an actual subscriber and media service, would allow the production system to render the media service to the actual subscriber.

19. A method comprising:
receiving notification of a subscriber and a new media service to be provided to the subscriber in a network environment, the new media service emanating downstream to the subscriber via a headend;
transmitting, to a subscriber system under test upstream from the headend, a generated test transaction indicative of providing the new media service to the subscriber,
the test transaction including one or more data items corresponding to a successful rendering of the media service to the subscriber;
validating based on the transaction, configuration settings in a test network upstream from a the headend by comparing the included data items to known values consistent with providing the new media service to the subscriber, the test network simulating an actual network over which the service is to be provided to the subscriber in the network environment, the test network and the actual network invoking support systems upstream from the headend, the support systems continuing to perform operations for actual media services via the actual network for rendering the media service to subscribers during the validation of the configuration settings, each support system having at least one data item updated by the test transaction for representing a successful deployment of the media service;
identifying the data items stored in the plurality of support systems corresponding to the updates made based on the test transaction, the support systems continuing to perform operations for actual media service rendering to subscribers while a result value is computed;
the media service being a video stream and the test transaction including a subscriber, a geographic area, a service level and a channel, validating the configuration settings further comprising:
i) identifying a service level of the subscriber,
ii) identifying a set of channels based on the service level and the geographic area,
iii) determining if the channel in the test transaction is included in the identified set of channels, and
iv) determining if the head end is directed to render the video stream based on whether the channel is in the identified set of channels;
delivering, based on the validation, the result value indicative of whether the test transaction includes the data items for successfully providing the designated media service to the subscriber; and
implementing the validated configuration settings upstream from the headend in the actual network to provide the media service to the subscriber downstream from the headend.

* * * * *